United States Patent
Belikovetsky et al.

(10) Patent No.: US 11,102,245 B2
(45) Date of Patent: *Aug. 24, 2021

(54) DECEPTION USING SCREEN CAPTURE

(71) Applicant: Interwise Ltd., Airport City (IL)

(72) Inventors: Sofia Belikovetsky, Petah Tikva (IL); Ofer Hacohen, Tel-Aviv (IL); Steven Lauderdale, Efrat (IL)

(73) Assignee: INIERWISE LTD., Airport City (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,148

(22) Filed: Aug. 14, 2019

(65) Prior Publication Data

US 2019/0373020 A1    Dec. 5, 2019

Related U.S. Application Data

(63) Continuation of application No. 15/381,029, filed on Dec. 15, 2016, now Pat. No. 10,425,445.

(51) Int. Cl.
*H04L 29/06* (2006.01)
*H04W 12/128* (2021.01)

(52) U.S. Cl.
CPC ....... *H04L 63/1491* (2013.01); *H04W 12/128* (2021.01)

(58) Field of Classification Search
CPC . H04L 63/1441; H04L 63/1491; G06F 21/55; G06F 21/554; G06F 21/60;
(Continued)

(56) References Cited

U.S. PATENT DOCUMENTS 6,631,407 B1    10/2003    Mukaiyama et al.
7,774,459 B2     8/2010    Wang et al.
(Continued)

FOREIGN PATENT DOCUMENTS

CN         1889573 A        1/2007
CN     106201468 A  *  12/2016  ............. G06F 9/451
(Continued)

OTHER PUBLICATIONS

US 8,650,641 B2, 02/2014, Sallam (withdrawn)
(Continued)

*Primary Examiner* — Khang Do
(74) *Attorney, Agent, or Firm* — Amin, Turocy & Watson, LLP

(57) ABSTRACT

Multiple deception techniques utilized to mislead malicious entities that attempt to gather information associated with a computing device are implemented by changing a single result. In one aspect, requests for screen captures are intercepted and it is determined whether the requests are triggered due to user interaction (e.g., pressing a button and/or key) and/or received from an authorized application/device. If determined that the requests are not triggered due to user interaction and/or are received from an unauthorized application/device, a response comprising one of several pre-prepared or dynamically generated screen captures that are embedded (and/or appended) with misleading information (e.g., fake credentials, fake documents marked as important/ hidden, etc.) is generated. Applications that attempt to utilize the misleading information can be flagged as malware.

20 Claims, 12 Drawing Sheets

(58) Field of Classification Search
CPC .... G06F 21/602; G06F 21/62; G06F 21/6218; G06F 21/6245; G06F 9/451; G06F 21/50
See application file for complete search history.

(56) References Cited

U.S. PATENT DOCUMENTS

| | | | |
|---|---|---|---|
| 8,156,556 B2 | 4/2012 | Krishnamurthy | |
| 8,181,250 B2 | 5/2012 | Rafalovich et al. | |
| 8,321,930 B1 | 11/2012 | Taylor et al. | |
| 8,549,642 B2 | 10/2013 | Lee | |
| 8,549,643 B1 | 10/2013 | Shou | |
| 8,595,495 B2 | 11/2013 | Mayer | |
| 8,739,281 B2 | 5/2014 | Wang et al. | |
| 8,825,697 B2* | 9/2014 | Foresti | G06F 16/2455 707/769 |
| 8,826,400 B2 | 9/2014 | Amaya Calvo et al. | |
| 8,966,624 B2 | 2/2015 | Sallam | |
| 9,032,525 B2 | 5/2015 | Sallam | |
| 9,377,991 B1* | 6/2016 | Rapport | G06F 16/438 |
| 9,398,042 B1 | 7/2016 | Dodke | |
| 9,516,059 B1* | 12/2016 | Dotan | H04L 63/1491 |
| 10,244,369 B1* | 3/2019 | Sharifi | G06F 16/2228 |
| 2004/0034794 A1 | 2/2004 | Mayer et al. | |
| 2005/0076237 A1 | 4/2005 | Cohen et al. | |
| 2005/0166072 A1* | 7/2005 | Converse | H04W 12/122 726/5 |
| 2006/0034177 A1* | 2/2006 | Schrempp | H04L 63/14 370/236 |
| 2007/0157203 A1* | 7/2007 | Lim | H04L 63/20 718/100 |
| 2007/0234212 A1* | 10/2007 | de Souza | G06F 3/0481 715/703 |
| 2009/0150174 A1* | 6/2009 | Buck | G16H 10/60 705/2 |
| 2009/0328216 A1* | 12/2009 | Rafalovich | H04L 43/0876 726/23 |
| 2010/0077483 A1* | 3/2010 | Stolfo | H04L 63/1466 726/24 |
| 2010/0205667 A1 | 8/2010 | Anderson et al. | |
| 2011/0321139 A1* | 12/2011 | Jayaraman | G06F 21/51 726/4 |
| 2012/0084866 A1 | 4/2012 | Stolfo | |
| 2012/0255001 A1 | 10/2012 | Sallam | |
| 2013/0160079 A1* | 6/2013 | Hebert | H04L 63/145 726/3 |
| 2013/0263226 A1* | 10/2013 | Sudia | G06F 21/60 726/4 |
| 2013/0312099 A1 | 11/2013 | Edwards et al. | |
| 2014/0041024 A1* | 2/2014 | Larkins | G06F 21/554 726/22 |
| 2014/0218385 A1* | 8/2014 | Carmi | G06T 7/136 345/590 |
| 2014/0253668 A1* | 9/2014 | Yoshida | H04N 7/15 348/14.07 |
| 2014/0259158 A1 | 9/2014 | Brown et al. | |
| 2014/0359769 A1 | 12/2014 | Sabin | |
| 2015/0047032 A1 | 2/2015 | Hannis et al. | |
| 2015/0381655 A1* | 12/2015 | Zeltser | H04L 63/1491 726/23 |
| 2016/0012222 A1* | 1/2016 | Stolfo | G06F 21/554 726/23 |
| 2016/0094560 A1* | 3/2016 | Stuntebeck | H04L 63/08 726/1 |
| 2016/0100033 A1* | 4/2016 | Kridlo | H04L 67/36 709/203 |
| 2016/0105482 A1 | 4/2016 | Bradley et al. | |
| 2016/0117061 A1 | 4/2016 | Hodgart et al. | |
| 2016/0119377 A1* | 4/2016 | Goldberg | G06F 40/40 726/12 |
| 2016/0180087 A1* | 6/2016 | Edwards | G06F 21/566 726/24 |
| 2016/0359882 A1* | 12/2016 | Touboul | G06F 21/55 |
| 2016/0371476 A1 | 12/2016 | Turgeman et al. | |
| 2017/0006188 A1* | 1/2017 | Amichai | H04N 5/3454 |
| 2017/0039448 A1* | 2/2017 | Ganda | G06K 9/6202 |
| 2017/0068829 A1* | 3/2017 | Shaw | H04N 1/32144 |
| 2017/0091469 A1* | 3/2017 | Leemet | G06F 16/116 |
| 2017/0098097 A1* | 4/2017 | Van Eerd | H04W 8/183 |
| 2017/0104893 A1 | 4/2017 | Hardy et al. | |
| 2017/0132742 A1* | 5/2017 | Deluca | G06K 9/3216 |
| 2017/0134423 A1* | 5/2017 | Sysman | G06F 21/554 |
| 2017/0186127 A1* | 6/2017 | Yu | G06F 3/04845 |
| 2017/0277403 A1* | 9/2017 | Huang | G06F 3/04842 |
| 2017/0310705 A1* | 10/2017 | Gopalakrishna | H04L 41/0886 |
| 2018/0027019 A1* | 1/2018 | Ligman | H04L 63/20 726/1 |
| 2018/0054461 A1 | 2/2018 | Dubs et al. | |
| 2018/0124073 A1* | 5/2018 | Scherman | H04L 63/1425 |
| 2018/0212995 A1* | 7/2018 | Sysman | G06F 21/554 |
| 2018/0262529 A1* | 9/2018 | Allen | H04L 63/061 |
| 2018/0268515 A1* | 9/2018 | Li | G06T 3/0006 |

FOREIGN PATENT DOCUMENTS

| | | |
|---|---|---|
| CN | 106201468 A | 12/2016 |
| WO | 02/098100 A1 | 12/2002 |
| WO | 2011/139687 A1 | 11/2011 |

OTHER PUBLICATIONS

Sofia Belikovetsky, et al., U.S. Appl. No. 16/540,148, filed Aug. 14, 2019, Deception Using Screen Capture.

Becker, Russell W., "A test bed for detection of botnet infections in low data rate tactical networks", URL: http://calhoun.nps.edu/bitstream/handle/10945/4650/09Sep_Becker.pdf?sequence=1, Sep. 2009, 79 pages.

Yip, Jay, "A Practical guide to understanding wireless networking concepts, security protocols, attack, and safer deployment schemes", URL: http://scholarworks.ril.edu/cgi/viewcontenl.cgi?article=8070&context=theses, Oct. 2003, 59 pages.

Yates, David, "A System for Characterising Internet Background Radiation", URL: http://www.cs.ru.ac.za/research/g11y1408/lhesis.pdf, Oct. 31, 2014, 78 pages.

McClean et al., A preliminary cyber-physical security assessment of the Robot Operating System (ROS), URL: http://permalink.lanl.gov/objecl/tr?what=info:lanlrepo/lareport/LAUR1323117, SPIE Defense, Security, and Sensing, International Society for Optics and Photonics, Apr. 2013, 24 pages.

Non-Final Office Action received for U.S. Appl. No. 15/381,029 dated Nov. 14, 2018, 69 pages.

Notice of Allowance received for U.S. Appl. No. 15/381,029 dated May 15, 2019, 36 pages.

* cited by examiner

DECEPTION USING SCREEN CAPTURE

RELATED APPLICATION

The subject patent application is a continuation of, and claims priority to, U.S. patent application Ser. No. 15/381,029 (now U.S. Pat. No. 10,425,445), filed Dec. 15, 2016, and entitled "DECEPTION USING SCREEN CAPTURE," the entirety of which application is hereby incorporated by reference herein.

TECHNICAL FIELD

The subject disclosure relates to computer security and privacy, e.g., deception using screen capture.

BACKGROUND

In modern day society, connectivity to public networks, such as the Internet, is highly desirable. However, user devices and/or systems that are connected to the Internet are susceptible to attack by malicious entities seeking to access private user information. In the last few years, the information security domain has seen a large growth in data leakage attacks, wherein a malicious entity employs malware to retrieve valuable information from a computer system. As an example, malware can comprise worms, viruses, Trojan horses, spyware, etc. that can be installed on a user device and/or a network device coupled to the user device/system. Some of the malwares capture screenshots from a computer to monitor user activity. Further, the malware can also detect input, typed by the user, which, along with screenshots, can provide a hacker with important and/or sensitive data (e.g., user names, passwords, personal identification numbers (PIN), etc.).

Various techniques have been developed and used to detect the presence of such malware; however, it is challenging to identify the data that has been accessed and/or used by the attacker. Some conventional techniques utilize a honeypot technique wherein fake or non-genuine data, that appears to be legitimate, is included as part of the system in hopes that an attacker will access and utilize only the fake data. Typically, access to the fake data is monitored to detect the unauthorized use of network resources. Conventional deception techniques focus around network and authentication by adding fake information alongside of valid information and require tailored changes to a host per scenario.

DETAILED DESCRIPTION

Figure 1:
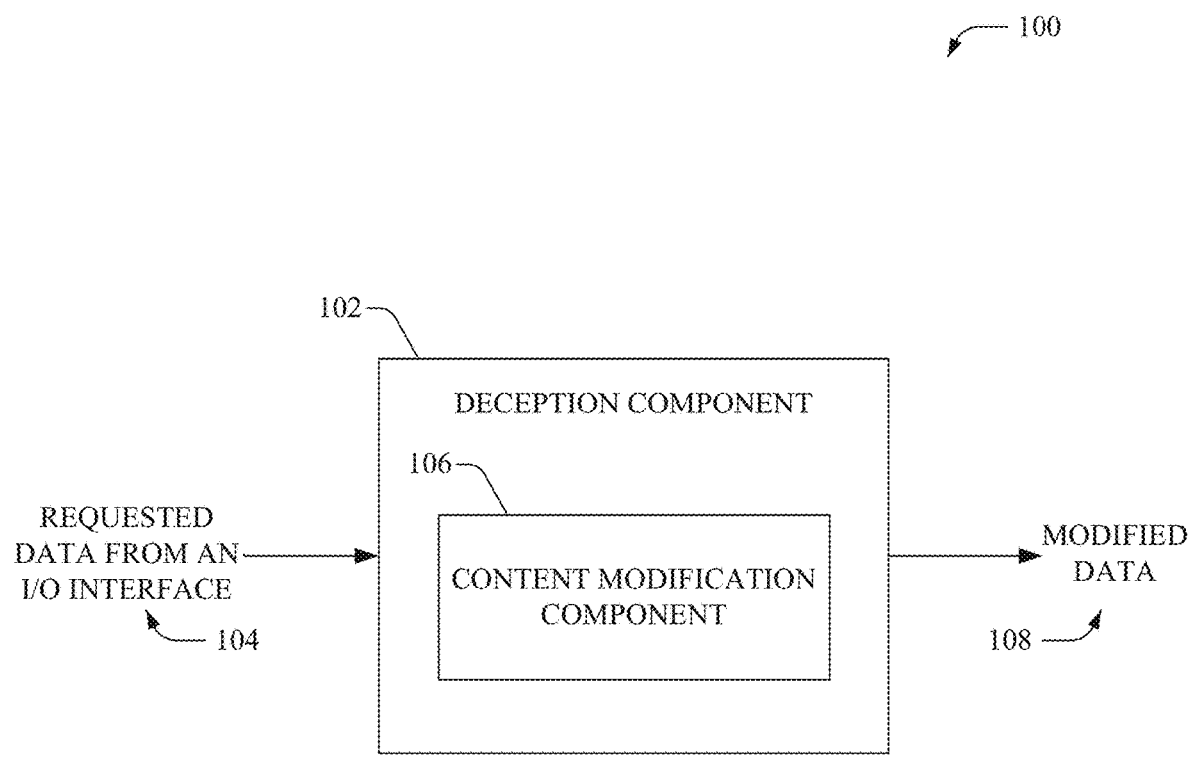
FIG. 1 illustrates an example system that facilitates detection of compromise in computing devices.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive, electrically erasable programmable read-only memory (EEPROM), etc.). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary"

is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Computing devices connected to communication network(s) are highly susceptible to security attacks by malicious entities. Malicious entities utilize various hacking mechanisms to access private, sensitive, classified, and/or important data from the computing devices. For example, they can gather the data by capturing the screen (e.g., periodically). The systems and methods disclosed herein provide an easy and seamless technique to deceive attackers that are gathering information about the computing device. In one aspect, the system can identify requests for screen captures that are not received from an authorized user and/or application (app) and provide the requesting entity with a screenshot that is embedded (and/or appended) with additional data (e.g., fake credentials, fake documents marked as important/hidden, etc. that appear to be legitimate) to deceive the attacker.

In one aspect, the subject disclosure relates to a system, comprising: a processor and a memory that stores executable instructions that, when executed by the processor, facilitate performance of operations, comprising receiving request data indicative of a request for media data that is being presented via an output interface of the system. The operations further comprise in response to determining, based on an analysis of the request data, that the request data does not satisfy a defined access criterion: embedding deception data into the media data to generate modified media data; and employing the modified media data to respond to the request.

Further, another aspect of the subject disclosure relates to a method, comprising intercepting, by a system comprising a processor, a request for display data that is being presented via an output interface of the system; and in response to determining that the request does not satisfy a defined access criterion, modifying, by the system, the display data, wherein the modifying comprises adding deception data to the display data to generate modified display data that is to be employed to respond to the request.

In yet another aspect, the subject disclosure relates to a machine-readable storage medium, comprising executable instructions that, when executed by a processor, facilitate performance of operations, comprising: in response to determining that command data, indicative of an instruction to provide content that has been presented via an output interface of a device, has been received, analyzing the command data; and in response to determining that the command data does not satisfy a defined access criterion, providing an altered version of the content, wherein the altered version of the content comprises deception data that has been added the content.

Referring initially to FIG. 1, there illustrated is an example system 100 that facilitates detection of compromise in computing devices, according to one or more aspects of the disclosed subject matter. As an example, system 100 can be part of, and/or coupled to, most any computing device, such as, but not limited to, network devices for example, a router, a gateway, an access point device, etc., industrial automation devices, corporate servers, consumer electronic devices, for example, a tablet computer, a digital media player, a digital photo frame, a digital camera, a media player, a cellular phone, a personal computer, a personal digital assistant (PDA), a smart phone, a laptop, a gaming system, set top boxes, home security systems, Internet of Things devices, connected vehicles, at least partially automated vehicles (e.g., drones), etc. Oftentimes attackers can employ malicious software (e.g., malware) that can access information from the computing device that can be utilized to obtain private and/or sensitive data. For example, the attacker can identify security data (e.g., user credentials) and gain access to private user/company data. In another example, the attacker can monitor user activity and/or receive images/video captured by the user device. In one aspect, the malware can access the data by requesting information from an input/output (I/O) interface of (and/or coupled to) the computing device. As an example, the malware can request for a screenshot (e.g., an image of what is being display on a graphical user interface). If such screenshot data is collected by the malware periodically (e.g., every 30 seconds), the attacker can easily monitor user activity and/or access private data. It is noted that the subject specification is not limited to screenshots, and that the requested data can include, but is not limited to various other data, such as, media being played by the device, data recorded by a sensor of the device, etc.

According to an embodiment, a deception component 102 can be employed to intercept the data requested from the I/O interface 104 (e.g., a screenshot image from a graphical user interface (GUI)). The deception component 102 can determine whether the data 104 was collected in response to a request from an authorized application, device, and/or user, and/or in response to a command entered by pressing (and/or touching) keys and/or buttons of an input interface (e.g., keyboard, touchscreen, etc.) of the computing device. If determined that the data 104 has been requested by the authorized application, device, and/or user, and/or based on the command entered by pressing keys and/or buttons of the input interface, an unaltered version of the data 104 can be provided. However, if determined that the data 104 has been requested by the authorized application and/or user, and/or based on the command entered by pressing keys and/or buttons of the input interface, a content modification component 106 can be utilized to alter the data and provide the modified data 108 to the requesting entity. Moreover, the content modification component 106 can insert within, and/or append to, the requested data 104, false/fake information that can be utilized to deceive an attacker. By controlling the data sent to the attacker, system 100 can be employed to direct the attacker to specific data (e.g., false/fake information that appears legitimate). For example, the modified data 108 can comprise a screen capture image that highlights the fake and/or misleading information and increases the chances that the attacker will take the bait (e.g., utilize the fake information). The fake/misleading information can comprise most any data, which if used will flag the malware and/or notify a user. For example, the fake/misleading information can comprise security data (e.g., fake usernames, passwords, credentials, PIN numbers, etc.), address data (e.g., Internet Protocol (IP) addresses of system resources), documents (e.g., files, folders, etc.) comprising misleading content that are marked as important, classified, hidden, etc.

It is noted that in some embodiments, at least a portion of the system 100 can reside within a network, for example, a cloud. As an example, a cloud can include resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud. Typically, users can opt-in to utilize the system 100, by adjusting appropriate privacy and/or security settings.

Figure 2:
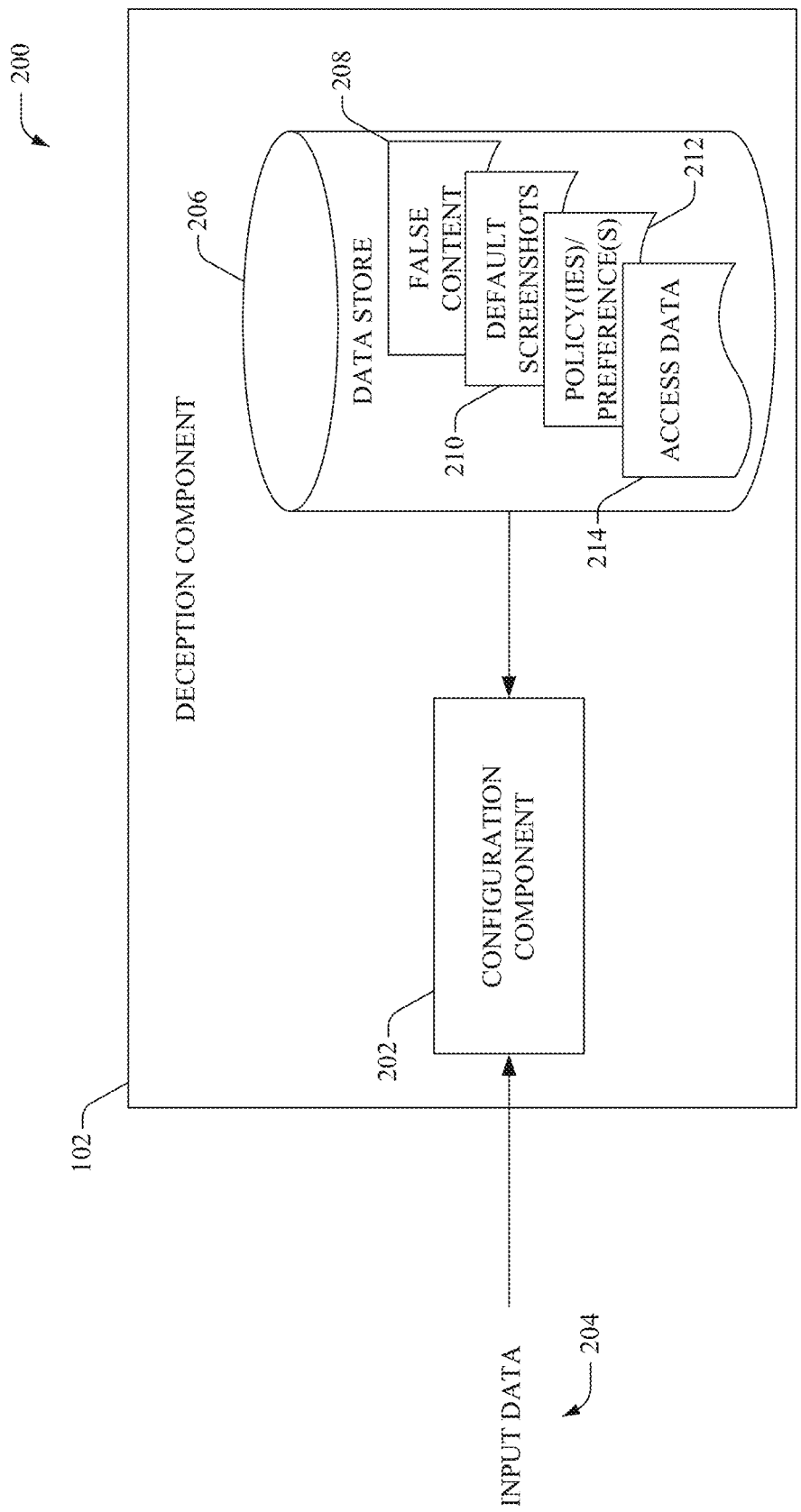
FIG. 2 illustrates an example system for configuration of a deception system in accordance with the subject embodiments.

Referring now to FIG. 2, there illustrated is an example system 200 for configuration of a deception system, in accordance with an aspect of the subject disclosure. In one aspect, system 200 can reside (completely or partially) within most any user equipment (UE) or network device that has, or is coupled to, an I/O interface, such as, but not limited to a GUI. System 200 can comprise a deception component 102 that can generate data utilized to deceive and/or mislead a malicious entity (e.g., attacker/hacker). It is noted that the deception component 102 can comprise functionality as more fully described herein, for example, as described above with regard to system 100.

According to an aspect, a configuration component 202 can receive input data to provision (and/or update) the system 200. As an example, input data 204 can be received from a user, network administrator, and/or a security management application (e.g., via an input interface of the computing device, via an over-the-air (OTA) update, and/or from various software distribution platforms). The configuration component 202 can store the input data 204 in data store 206. The input data 104 can comprise, but is not limited to, false content 208, default screenshots 210, policy (ies)/preference(s) 212, access data 214, etc. In one example, the false content 208 can include, but is not limited to, media (e.g., images, audio clips, videos, etc.) can be inserted into, appended to, and/or superimposed on, content requested by an unauthorized requestor (e.g., attacker). For example, the images can include an image of a pop-up window that depicts a login prompt with invalid/fake username and password. In another example, the images can include an image of a directory having fake folders and/or documents. In yet another example, the images can include an image of a list of fake devices/servers coupled to the computing device. In an aspect, if a request for a screenshot is received from the unauthorized requestor, the images can be superimposed and/or overlapped over a current screenshot to provide the unauthorized requestor with incorrect and/or misleading information.

The default screenshots 210 can comprise fake images of the computing device's screen that include misleading/fake information (e.g., pop-up window that depicts a login prompt with invalid/fake username and password, a directory having fake folders and/or documents, a list of fake devices/servers, etc.). In an aspect, if a request for a screenshot is received from the unauthorized requestor, one of the default screenshots 210 can be provided to the unauthorized requestor instead of a current/real screenshot of the computing device's screen.

Policy(ies)/preference(s) 212 can include one or more rules for selecting data provided to an unauthorized requestor. For example, the policy(ies)/preference(s) 212 can specify which images are to be superimposed on the current screenshot of the computing device's screen, and/or select a fake screenshot from the default screenshots 210 based on various criteria, such as, but not limited to, time of day, date, requestor-related data, user-related data, etc. In another example, the policy(ies)/preference(s) 212 can specify that the images and/or default screenshots 212 be selected at random.

Access data 214 can include one or more access list(s), for example, white list(s) that comprise a set of users, devices and/or applications approved for receiving data being presented via a device interface (e.g., a screenshot image). Additionally or alternatively, the one or more access list(s) can include black list(s)) that comprise a set of users, devices and/or applications that are not approved for receiving data being presented via a device interface (e.g., a screenshot image). An access list(s) (e.g., white list(s) or black list(s)) can be relational database tables that include a set of one or more fields for each attribute in the tables. It is noted, however, that other table models (e.g., hierarchical, object oriented) can be employed to define access list(s). Various attributes can be defined for access list(s); for example, entity identifier attribute, application data, etc. In one example, the blacklist(s) can be populated based on a list of known malwares (e.g., accessed from a security management device).

It is noted that the data store 206 can comprise volatile memory(s) or nonvolatile memory(s), or can comprise both volatile and nonvolatile memory(s). Examples of suitable types of volatile and non-volatile memory are described below with reference to FIG. 10. The memory (e.g., data stores, databases) of the subject systems and methods is intended to comprise, without being limited to, these and any other suitable types of memory.

Figure 3:
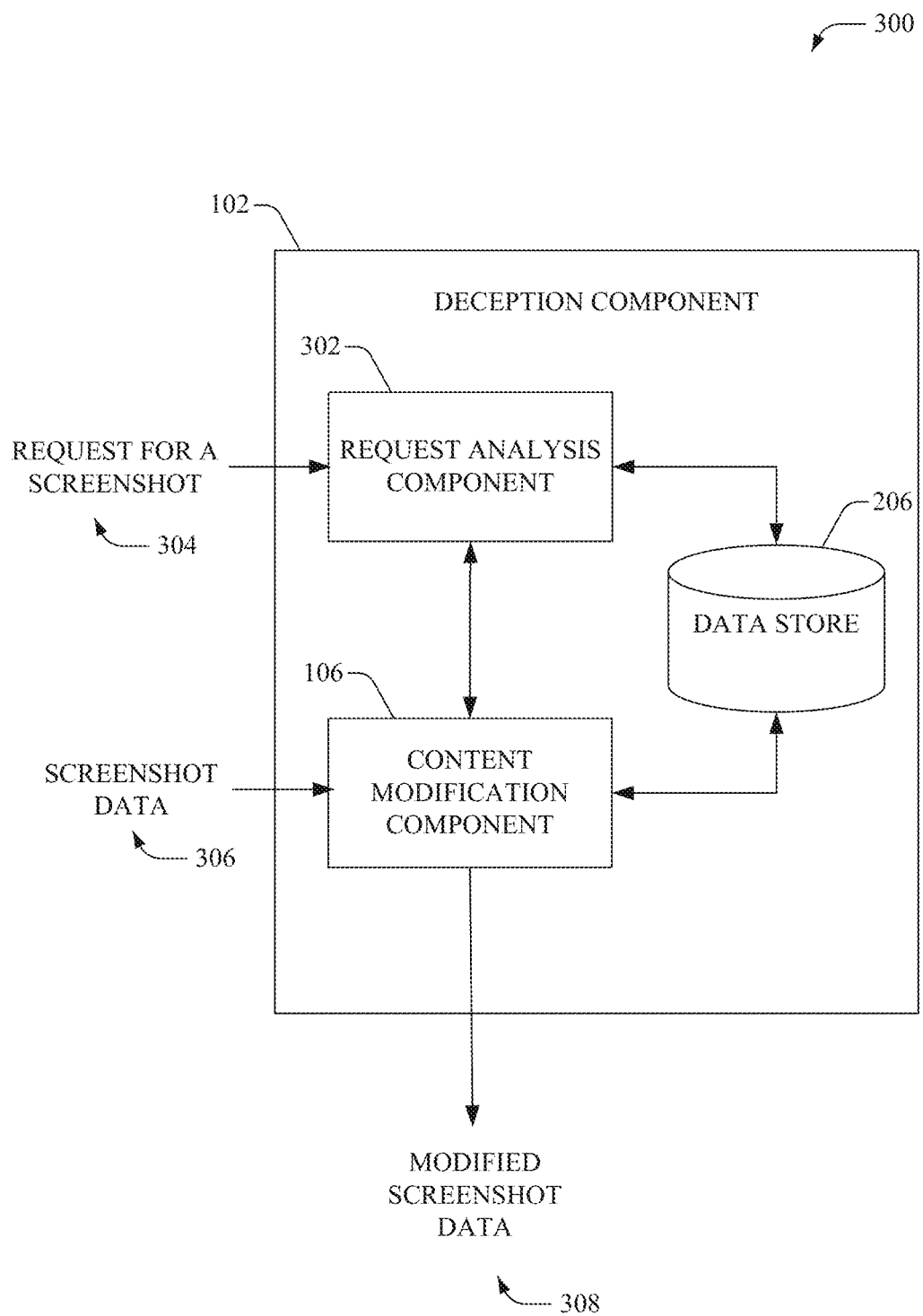
FIG. 3 illustrates an example system for dynamically generating deception data to be provided to unauthorized entities.

FIG. 3 there illustrated is an example system 300 for dynamically generating deception data to be provided to unauthorized entities, in accordance with an aspect of the subject disclosure. System 300 can efficiently deceive malicious entities that are gathering information about a computing device. A malware running on a computing device can try to gain as much information as it can in order to generate the next steps (e.g., stealing of data and/or lateral movement). Oftentimes, malwares gather information by capturing screenshots. System 300 detects requests for screenshot data from unauthorized entities (e.g., malwares) and provides them with screenshots that highlights fake information and increase the chances the unauthorized entities, if malicious, would utilize the fake information. It is noted that the deception component 102, content modification component 106, and data store 206 can comprise functionality as more fully described herein, for example, as described above with regard to systems 100-200. Further, it is noted that although FIG. 3 is described with respect to screenshots, the subject specification is not limited to screenshots and most any data related to an I/O interface of a computing device can be utilized.

According to an aspect, a request analysis component 302 can intercept a request for a screenshot 304. As an example, the request analysis component 302 can implement a hook function that can be employed to return different outputs for a screen capture function depending on how the function was called. The request analysis component 302 can evaluate the request and/or access data from the data store 206 to determine how the function was called. If determined (e.g., by the request analysis component 302) that the screen capture function was called by user interaction (e.g., pressing/selecting/touching a button or key) and/or by an authorized application, then the hook can return an image of the data being presented via a GUI, for example, screenshot data 306. Alternatively, if determined (e.g., by the request analysis component 302) that the screen capture function was not called by user interaction and/or by an authorized application, then the content modification component 106 can return one of several pre-prepared or generated on-the-fly screen captures, for example, based on policies and/or preferences stored in the data store 206. These fake screen captures comprise misleading information that if used by an unauthorized application will flag the unauthorized application as malware and report and/or delete/uninstall the malware. In one example, pre-prepared screen capture images can be easy and faster to return to an unauthorized requestor; however, they may be easier to detect as fake, for example, based on an incorrect timestamp or other information. Dynamically generated screen capture images can superimpose and/or insert objects and/or elements that highlight the fake and/or misleading information (e.g., that can be utilized to detect and/or flag malwares) over and/or into a real image of a screen capture. For example, the objects and/or elements can include but are not limited to windows, pop-up boxes, images, files, folders, network maps, drawings, text, text boxes, drop down menus, checkboxes, buttons, etc.

Figure 4:
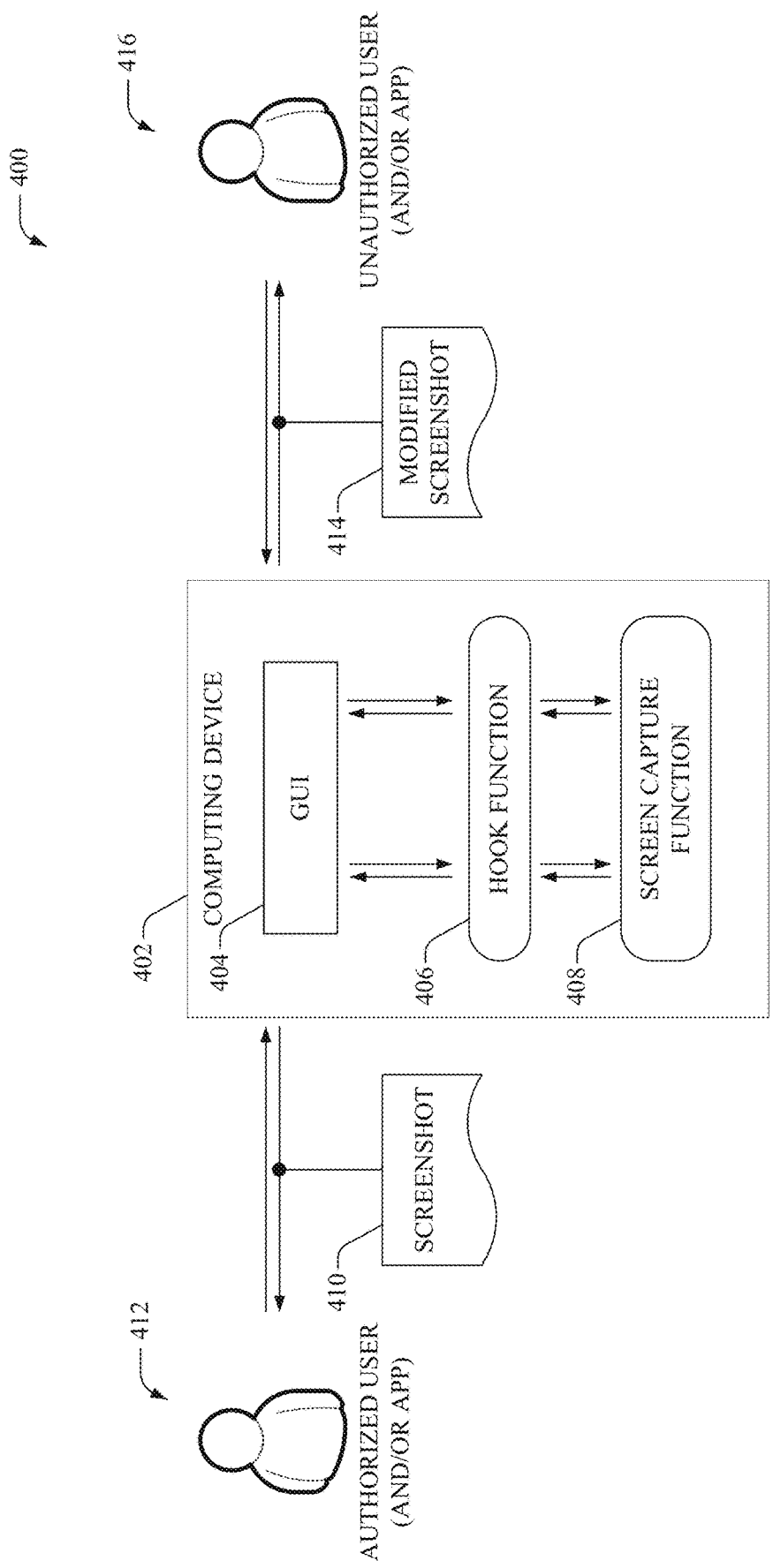
FIG. 4 illustrates an example system that employs a hook function to provide misleading information to unauthorized entities.

Referring now to FIG. 4, there illustrated is an example system 400 that employs a hook function to provide misleading information to unauthorized entities, according to an aspect of the subject disclosure. System 400 comprises a computing device 402 having (and/or coupled to) a GUI 404. As an example, the computing device 402 can include most any UE and/or network device, such as, but not limited to, a tablet computer, a media player, a cellular phone, a personal computer, a laptop, a gaming system, a set top box, a surveillance system, an industrial automation device, an Internet of Things device, a smart watch, a connected vehicles at least partially automated vehicles (e.g., drones), corporate servers, etc. Further, the GUI 404 can include, but is not limited to, a touch screen, a monitor, an LCD display, a smart television, etc.

In one embodiment, a hook function 406 can be implemented, for example, by the deception component 102, that is employed to generate different outputs for a screen capture function 408 based on various criteria, such as, but not limited to, how the function was called, access criteria, policy data, etc. For example, a hook is placed on the screen capture function 408 (e.g., GetWindowDC) and the hook function 406 can monitor the keystroke data (e.g., WM_KeyDown event) associated with a keypad (or other input interface of and/or coupled to the computing device 402). For every call of the screen capture function 408, the hook function 406, can determine whether the screen capture function 408 has been called in response to relevant user activity. As an example, user activity can be determined based on verifying that a specified set of buttons and/or keys (e.g., PrintScreen key) has been pressed (and/or selected) on the computing device 402 (and/or a keyboard coupled to the computing device 402), if a window of the application that triggers/requests the screen capture function 408 is active at the time the screen capture request was triggered, and/or if the application has a GUI, etc. If determined that the relevant user activity has been verified (e.g., specified set of buttons and/or keys were pressed/selected, the window was active, the application has a GUI, etc.) and/or the call was initiated by a whitelisted app, a screenshot 410 comprising an image of data being presented via GUI 404 can be transmitted to the authorized user and/or app 412. As an example, a copy of the image can be saved to a clipboard. Alternatively, if determined that the relevant user activity has not been verified (e.g., specified set of buttons and/or keys were not pressed/selected, the window was inactive, the application does not have a GUI, etc.), the call was not initiated by a whitelisted app, or the call was initiated by a blacklisted app, a modified screenshot 414 can be provided to the unauthorized user and/or app 416. The modified screenshot 414 can comprise a default screenshot image or a dynamically generated screenshot image that is created by superimposing and/or overlaying misleading information on a screen capture of the GUI 404.

The misleading/fake information that is to be inserted within the screenshot image can be controlled without having to insert it inside a list of real information. In one aspect, different types of misleading data (e.g., fake password, fake IP addresses of fake servers, and/or misleading document content) can be provided in the same modified screenshot 414. Although, FIG. 4 has been described with respect to screen captures of GUI 404, the subject specification is not that limited and most any data, such as, but not limited to, data being captured by device sensors (e.g., live video, audio, images, etc.) can also be embedded and/or superimposed with misleading content if requested by unauthorized users (or apps). Further, it is noted that computing device 402 can be controlled via any operating system (OS).

Figure 5A:
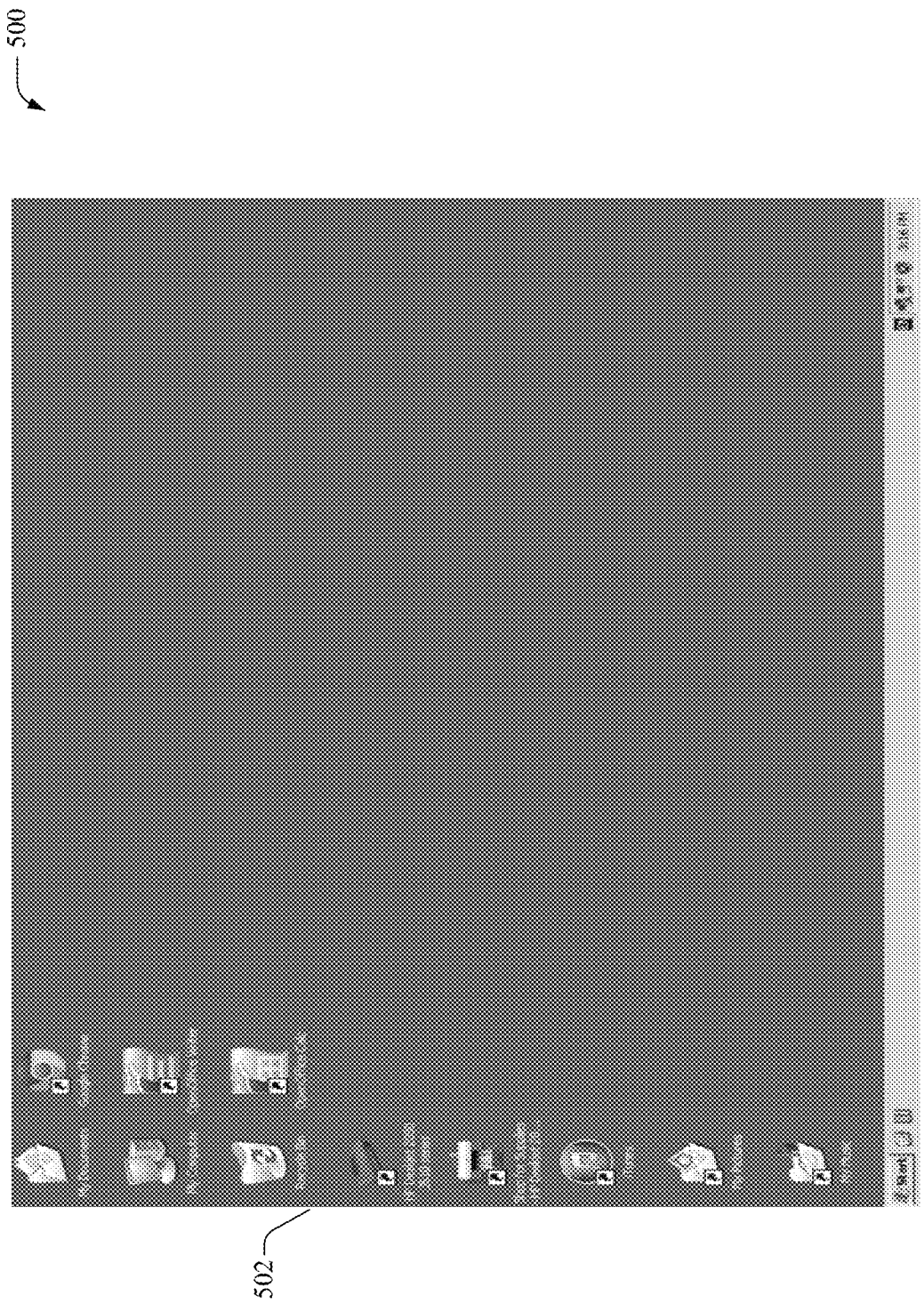
FIGS. 5A and 5B illustrate example screen capture images that are generated in response to a request for a screenshot.
Figure 5B:
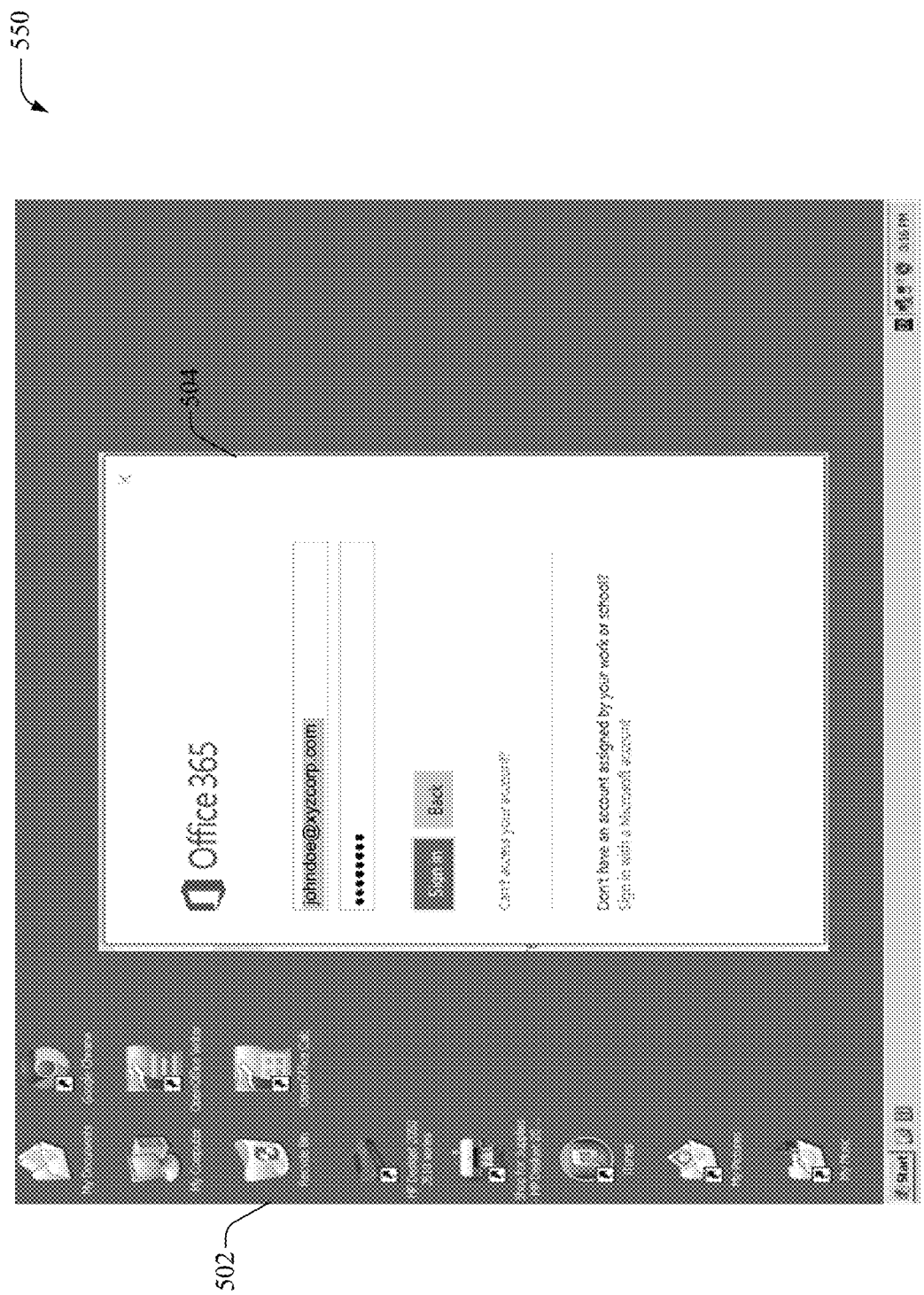

FIGS. 5A and 5B illustrate example screen capture images (500, 550) that can be generated in response to a request for a screenshot, according to aspects of the disclosed subject matter. As an example, image 500 comprises a screen capture 502 of a GUI (e.g., GUI 404) that is generated and returned in response to determining (e.g., by the deception component 102) that a request for a screen capture is received from an authorized user/app and/or determining (e.g., by the deception component 102) that the request is triggered due to user activity (e.g., a user pressing one or more keys). In another example, image 550 comprises a modified version of the screen capture 502 that is generated and returned in response to determining (e.g., by the deception component 102) that the request for the screen capture is received from an unauthorized user/app and/or determining (e.g., by the deception component 102) that the request is not triggered due to user activity (e.g., a user pressing one or more keys). In one aspect, misleading data, for example, window 504 can be overlaid on the screen capture 502. The example window 504 comprises a fake username and password (e.g., employed as bait). If the fake username and password is utilized by an entity, the entity can be flagged as a malicious entity. In one example, a user can be notified of the flagged entity and/or information associated with the entity can be included within a blacklist (e.g., stored in data store 206). Additionally or optionally, the fake information (e.g., username, password, etc.) can be utilized to determine an origin of the data leak. For example, unique content (e.g., fake information) per computing device can be generated such that a computing device that has been compromised by the malicious entity can be easily identified. Moreover, if an access attempt to the fake information (e.g., non-existing server) is detected, it can be determined that the device that attempted the access is compromised and additionally, an origin of the fake information can be determined (e.g., the device that has this specific address in its false content data store). This can provide additional investigation capabilities in scenarios wherein different devices attempt the access and originate the fake information.

Figure 6:
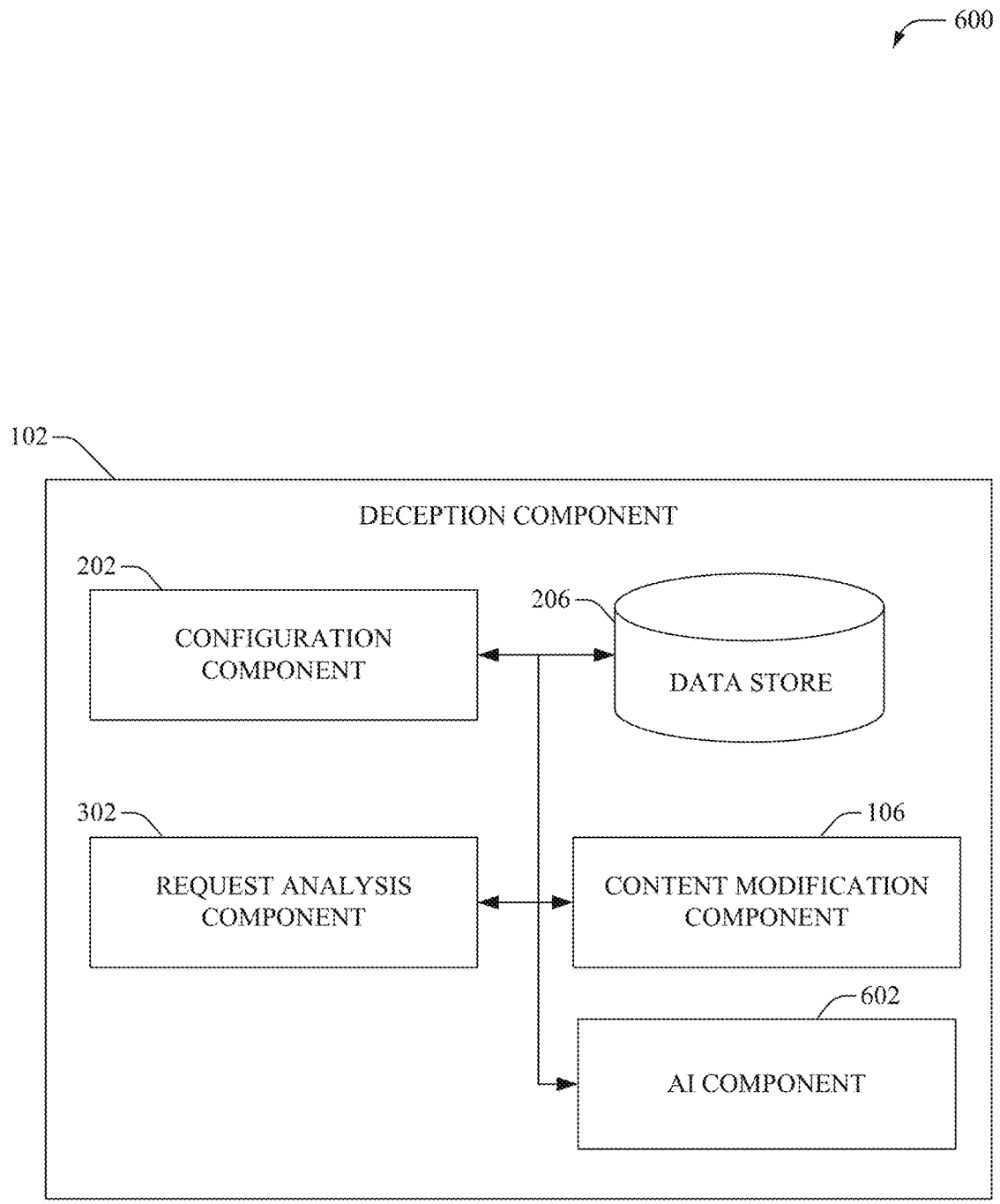
FIG. 6 illustrates an example system that facilitates automating one or more features in accordance with the subject embodiments.

Referring now to FIG. 6, there illustrated is an example system 600 that employs an artificial intelligence (AI) component (602) to facilitate automating one or more features in accordance with the subject embodiments. It can be noted that the deception component 102, content modification component 106, configuration component 202, data store 206, and request analysis component 302 can comprise functionality as more fully described herein, for example, as described above with regard to systems 100-300.

In an example embodiment, system 600 (e.g., in connection with automatically determining how and/or when to return modified screenshots) can employ various AI-based schemes (e.g., intelligent processing/analysis, machine learning, etc.) for carrying out various aspects thereof. Moreover, the AI component 602 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning-to a data set. In particular, AI component 602 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of app, type of device, etc.). For example, SVMs can be configured via a learning or training phase within a classifier constructor and feature selection module. Thus, the classifier(s) of AI component 602 can be used to automatically learn and perform a number of functions, comprising determining according to a predetermined criteria, selection of images/data that is to be added to a screenshot, placement of images/data that are to be added to a screenshot, type of images/data that is to be added to a screenshot, etc. The criteria can include, but is not limited to, historical patterns and/or trends, frequency of screen capture requests, security parameters, service provider preferences and/or policies, event data, bandwidth data, resource availability data, current time/date, and the like.

Figure 7:
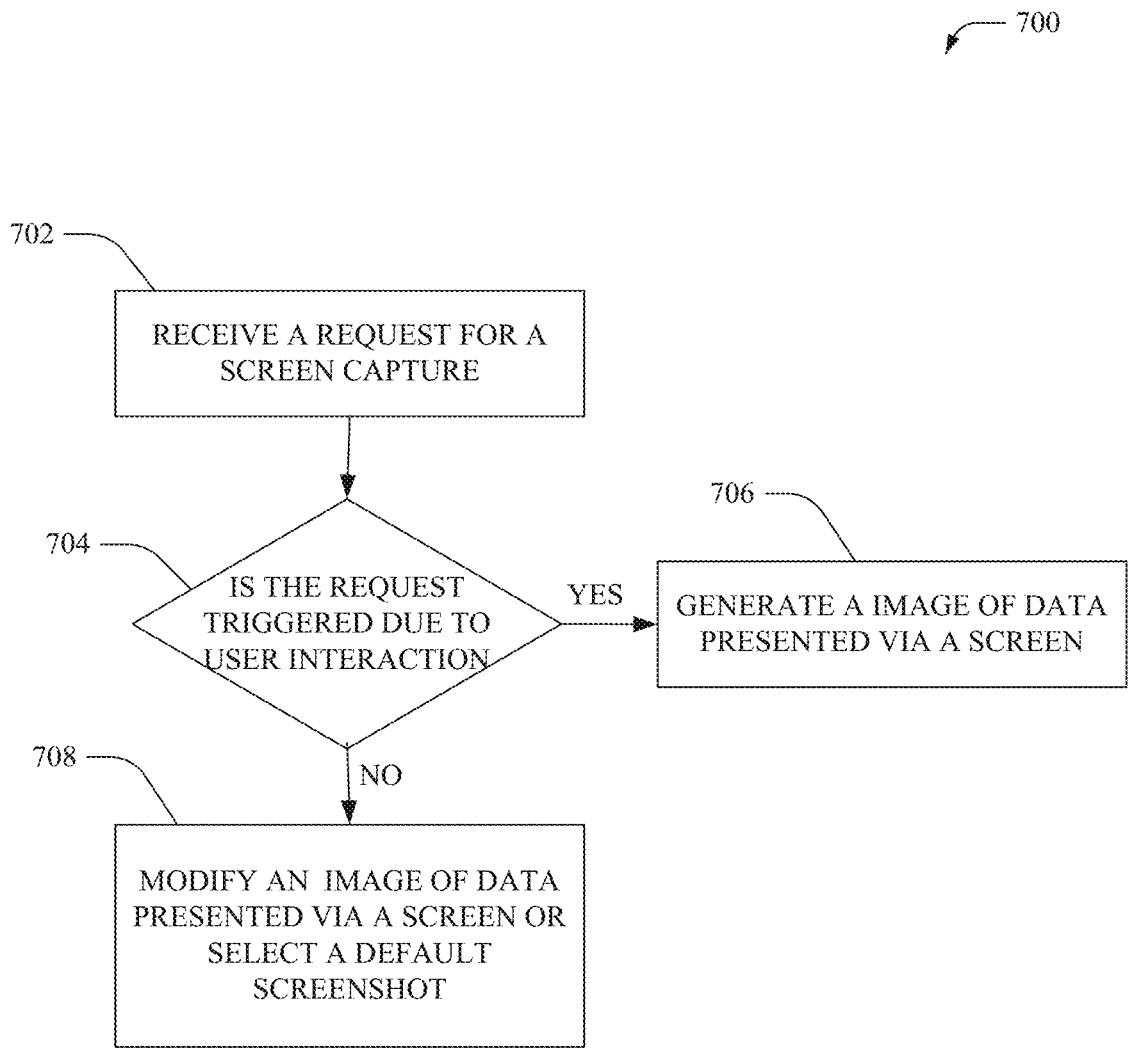
FIG. 7 illustrates an example method that facilitates generation of deception data based on user activity.
Figure 8:
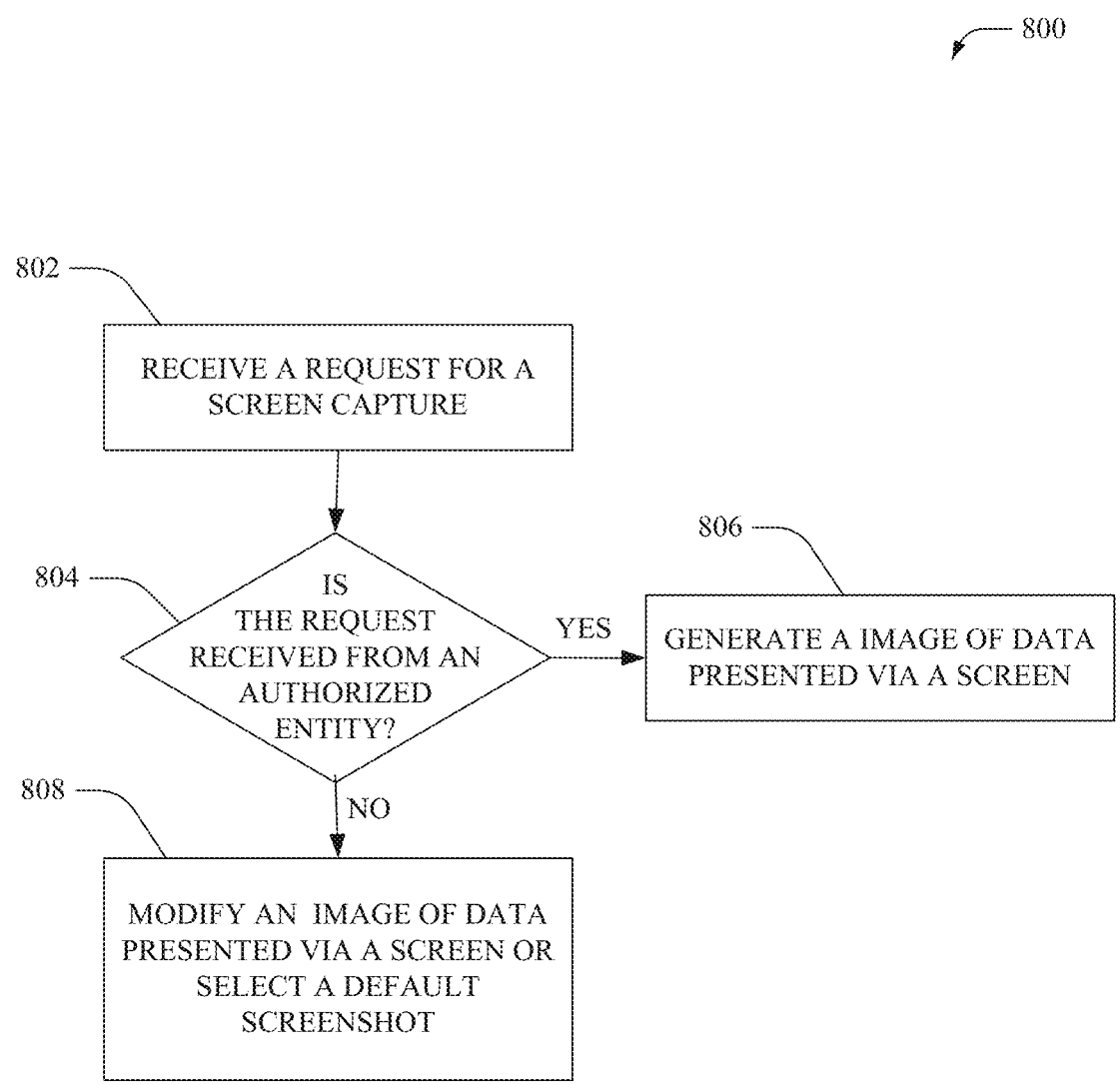
FIG. 8 illustrates an example method that facilitates generation of deception data based on access criteria.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates generation of deception data based on user activity, according to an aspect of the subject disclosure. In an aspect, method 700 can be implemented (partially or completely) by a computing device (e.g., UE and/or network device). At 702, a request for a screen capture can be received. As an example, the request can be triggered by calling a screen capture function. At 704, it can be determined whether the request is triggered due to user interaction (e.g., with an input interface of, and/or coupled to, the computing device). In one embodiment, a hook is placed on the capture screen function (e.g., GetWindowDC) and can monitor the keystroke data (e.g., WM_KeyDown event) associated with a keyboard. For example, for every call of the capture screen function, the hook function can determine user interaction criteria, such as but not limited to, whether a specified set of buttons and/or keys (e.g., PrintScreen key) has been pressed, whether the application that triggers the capture screen function is being executed or has been accessed/opened by the user, and/or whether the application has a GUI, etc. If determined that the request was triggered due to user interaction (e.g., due to a user pressing the specified set of buttons and/or keys, the application being executed, accessed, and/or opened by the user, the application determined to have a GUI, etc.), then at 706, an image of data being presented via a screen (and/or output interface of, and/or coupled to, the computing device) can be generated. In one example, the image (e.g., screenshot) can be saved in a designated folder, copied to a clipboard, and/or provided to an output interface (e.g., a printer). Alternatively, if determined that the request was not triggered due to user interaction, then at 708, an image of data being presented via a screen (and/or output interface of, and/or coupled to, the computing device) can be modified or a default screenshot image can be selected. In one example, the modified image (e.g., screenshot) can be saved in a designated folder, copied to a clipboard, and/or provided to an output interface (e.g., a printer). In one aspect, modified image can comprise false and/or misleading information utilized to deceive a malicious entity. As an example, a real screen capture image can be modified by superimposing, appending, embedding, inserting, overlaying, etc., with the false and/or misleading information. Further, the false and/or misleading information can be highlighted to increase the chances of the malicious entity utilizing the information and being detected.

FIG. 8 illustrates an example method 800 that facilitates generation of deception data based on access criteria, according to an aspect of the subject disclosure. In an aspect, method 800 can be implemented (partially or completely) by a computing device (e.g., UE and/or network device). At

802, a request for a screen capture can be received. As an example, the request can be initiated by calling a screen capture function. At 804, it can be determined whether the request is received from an authorized entity. In one embodiment, a hook is placed on the capture screen function (e.g., GetWindowDC) and can determine whether the requesting application, device, user is authorized (e.g., whitelisted). If determined that the request was received from an authorized entity, then at 806, an image of data being presented via a screen (and/or output interface of, and/or coupled to, the computing device) can be generated. In one example, the image (e.g., screenshot) can be saved in a designated folder, copied to a clipboard, and/or provided to an output interface (e.g., a printer). Alternatively, if determined that the request was received from an unauthorized entity, then at 808, an image of data being presented via a screen (and/or output interface of, and/or coupled to, the computing device) can be modified or a default screenshot image can be selected. In one example, the modified image (e.g., screenshot) can be saved in a designated folder, copied to a clipboard, and/or provided to an output interface (e.g., a printer). In one aspect, the modified image can comprise false and/or misleading information utilized to deceive a malicious entity. As an example, a real screen capture image can be modified by superimposing, appending, embedding, inserting, overlaying, etc., with the false and/or misleading information. Further, the false and/or misleading information can be highlighted to increase the chances of the malicious entity utilizing the information and being detected.

Figure 9:
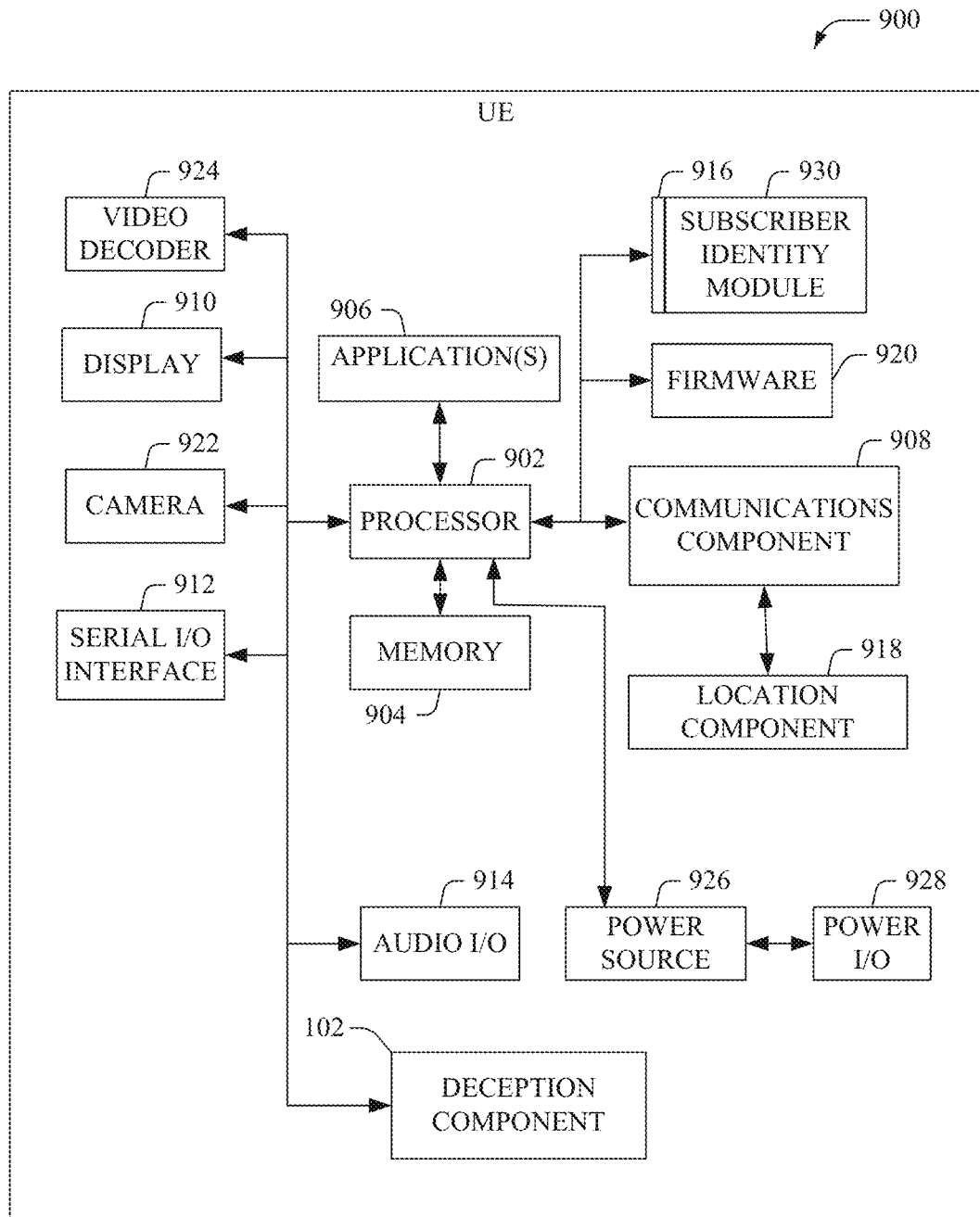
FIG. 9 illustrates an example block diagram of a user equipment suitable for deception based on content modification.
Figure 10:
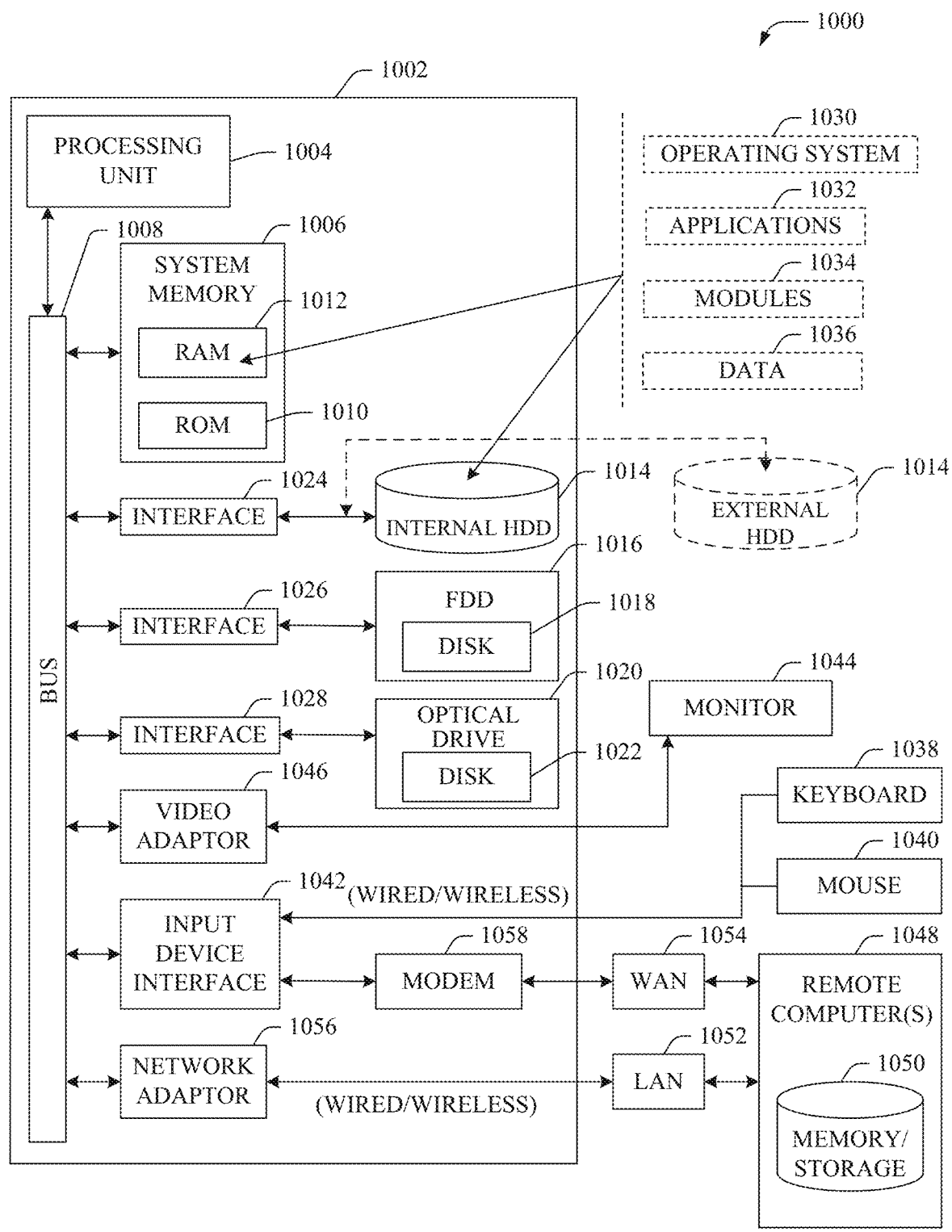
FIG. 10 illustrates a block diagram of a computer operable to execute the disclosed communication architecture.

To provide further context for various aspects of the subject specification, FIGS. 9 and 10 illustrate, respectively, a block diagram of an example UE 900 that facilitates deception techniques described herein and a wireless communication environment 1000, with associated components for operation and/or management of deception techniques described herein.

Referring now to FIG. 9, there is illustrated a block diagram of a UE 900 that facilitates deception based on content modification in accordance with the subject specification. Moreover, the UE 900 can be substantially similar to and include functionality associated with computing device 402, described herein. In one aspect, the UE 900 can include a processor 902 for controlling all onboard operations and processes. A memory 904 can interface to the processor 902 for storage of data and one or more applications 906 being executed by the processor 902. A communications component 908 can interface to the processor 902 to facilitate wired/wireless communication with external systems. The communications component 908 can interface to a location component 918 (e.g., GPS transceiver) that can facilitate location detection of the UE 900.

The UE 900 can include a display 910 (e.g., screen and/or touch screen) for displaying received content (and/or content to be transferred) and/or for displaying text information related to operating and using the device features. The display 910 can be can be substantially similar to and include functionality associated with GUI 404, described herein. A serial I/O interface 912 is provided in communication with the processor 902 to facilitate serial communication (e.g., USB, and/or IEEE 1394) via a hardwire connection. Audio capabilities are provided with an audio I/O component 914, which can include a speaker for the output of audio signals related to, for example, recorded data or telephony voice data, and a microphone for inputting voice signals for recording and/or telephone conversations.

Further, the UE 900 can include a slot interface 916 for accommodating a subscriber identity module (SIM) 930. A unique CTN is associated with the SIM 930 that can be utilized as a device identifier for UE 900. Firmware 920 is also provided to store and provide to the processor 902 startup and operational data. The UE 900 can also include a media capture component 922 such as a camera and/or a video decoder 924 for decoding encoded multimedia content. Further, the UE 900 can include a power source 926 in the form of batteries, which power source 926 interfaces to an external power system or charging equipment via a power I/O component 928. In addition, the UE 900 can include the deception component 102, which can be stored in memory 904 and/or implemented by an application 906. The deception component 102 can include respective functionality, as more fully described herein, for example, with regard to systems 100-400 and 600.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), application(s) server(s), equipment, system(s), interface(s), gateway(s), controller(s), node(s) and/or device(s) (e.g., deception component 102, content modification component 106, configuration component 202, data store 206, request analysis component 302, computing device 402, GUI 404, AI component 602, UE 900, etc.) disclosed herein with respect to systems 100-400, 600, and 900 can each comprise at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least Wi-Fi and Bluetooth™ wireless technologies or other communication technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRDRAM). Additionally, the disclosed memory components of systems or methods herein are intended to comprise, without being limited to comprising, these and any other suitable types of memory.

Figure 11:
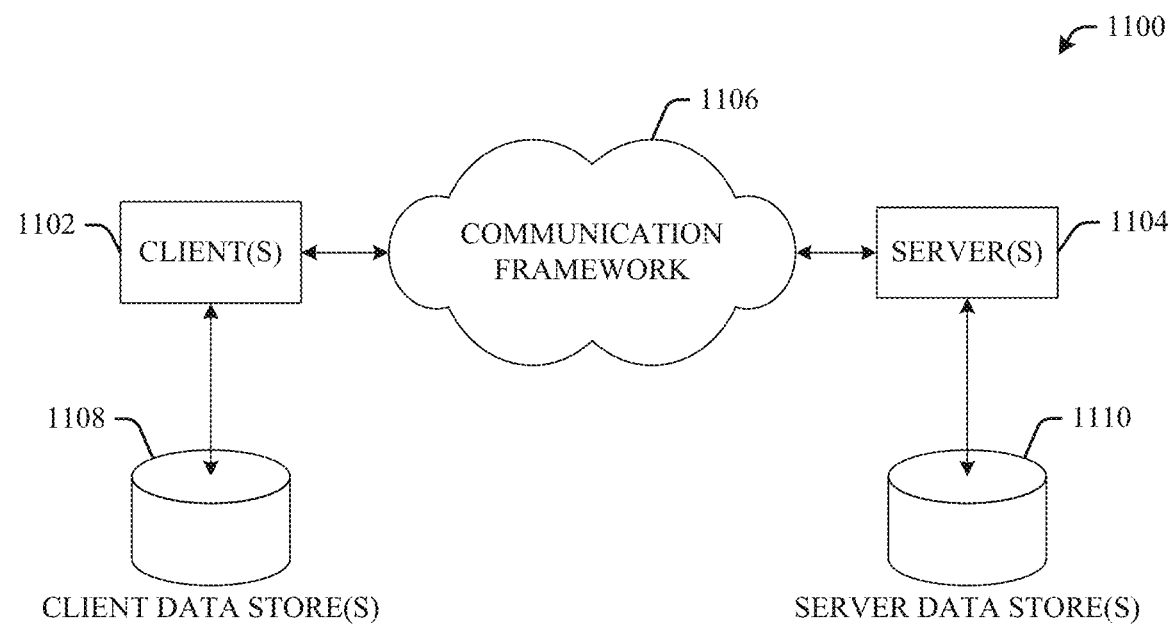
FIG. 11 illustrates a schematic block diagram of a computing environment in accordance with the subject specification.

Referring now to FIG. 11, there is illustrated a schematic block diagram of a computing environment 1100 in accordance with the subject specification. The system 1100 comprises one or more client(s) 1102. The client(s) 1102 can be hardware and/or software (e.g., threads, processes, computing devices).

The system 1100 also comprises one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may comprise a cookie and/or associated contextual information, for example. The system 1100 comprises a communication framework 1106 (e.g., a global communication network such as the Internet, cellular network, etc.) that can be employed to facilitate communications between the client(s) 1102 and the server(s) 1104.

Communications can be facilitated via a wired (comprising optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to determining that a request for a screenshot image for presentation via an output interface of the system does not satisfy a defined access criterion:
selecting deception data from a group of deception data based on a time of day of the request,
embedding the deception data into the screenshot image to generate a modified screenshot image, wherein the deception data comprises false data associated with security that is generated to appear to be legitimate data associated with the security, and
employing the modified screenshot image to respond to the request.

2. The system of claim 1, wherein the deception data represents false login data for a login field in the screenshot image.

3. The system of claim 1, wherein the deception data further comprises an additional image, and wherein the embedding comprises overlaying the additional image over the screenshot image.

4. The system of claim 1, wherein the determining comprises determining that the request has not been triggered in response to a user interaction event.

5. The system of claim 1, wherein the defined access criterion comprises a requirement that the request is received from an application that has a graphical user interface.

6. The system of claim 1, wherein the deception data represents false credential data.

7. The system of claim 1, wherein the deception data represents false address data representing a non-genuine internet protocol address.

8. A method, comprising:
receiving, by a system comprising a processor, a request for a screenshot image for presentation via an output interface of the system; and
in response to determining that the request does not satisfy a defined criterion, adding, by the system, deception data to the screenshot image to generate a modified screenshot image that is to be employed to respond to the request, wherein the deception data is selected from a group of deception data based on resource availability data of a resource of the system, and the deception data comprises false data associated with security information that is generated to mislead as representing legitimate data associated with the security information.

9. The method of claim 8, wherein the deception data represents false login data for a login field in the screenshot image.

10. The method of claim 8, wherein the deception data further comprises an additional image, and wherein the embedding comprises overlaying the additional image over the screenshot image.

11. The method of claim 8, wherein the determining comprises determining that the request has not been triggered in response to a user interaction event.

12. The method of claim 8, wherein the determining comprises determining that the request is received from an application that has not been authorized to access the screenshot image.

13. The method of claim 8, wherein the deception data represents false credential data.

14. The method of claim 8, wherein the deception data represents false address data representing a non-genuine internet protocol address.

15. A non-transitory machine-readable medium, comprising executable instructions that, when executed by a processor of a system, facilitate performance of operations, comprising:
in response to determining that a request for a screenshot image for presentation via an output interface of the system is from an unauthorized entity:
selecting misleading data from a group of misleading data based on bandwidth data for the system,
embedding the misleading data into the screenshot image to generate a modified screenshot image, wherein the misleading data comprises false data associated with a security domain that is generated to deceive as representing legitimate data associated with the security domain, and
employing the modified screenshot image to respond to the request.

16. The non-transitory machine-readable medium of claim 15, wherein the misleading data represents false login data for a login field in the screenshot image.

17. The non-transitory machine-readable medium of claim 15, wherein the misleading data further comprises an additional image, and wherein the embedding comprises overlaying the additional image over the screenshot image.

18. The non-transitory machine-readable medium of claim 15, wherein the determining that the request is from the unauthorized entity comprises determining that the request has not been triggered in response to a user interaction event.

19. The non-transitory machine-readable medium of claim 15, wherein the determining that the request is from the unauthorized entity comprises determining that the request is received from an application that has not been authorized to access the screenshot image.

20. The non-transitory machine-readable medium of claim 15, wherein the misleading data represents false credential data.

* * * * *